June 5, 1934.  F. R. HOHMANN  1,961,494
SHEET GLASS APPARATUS
Filed Aug. 10, 1933  2 Sheets-Sheet 1
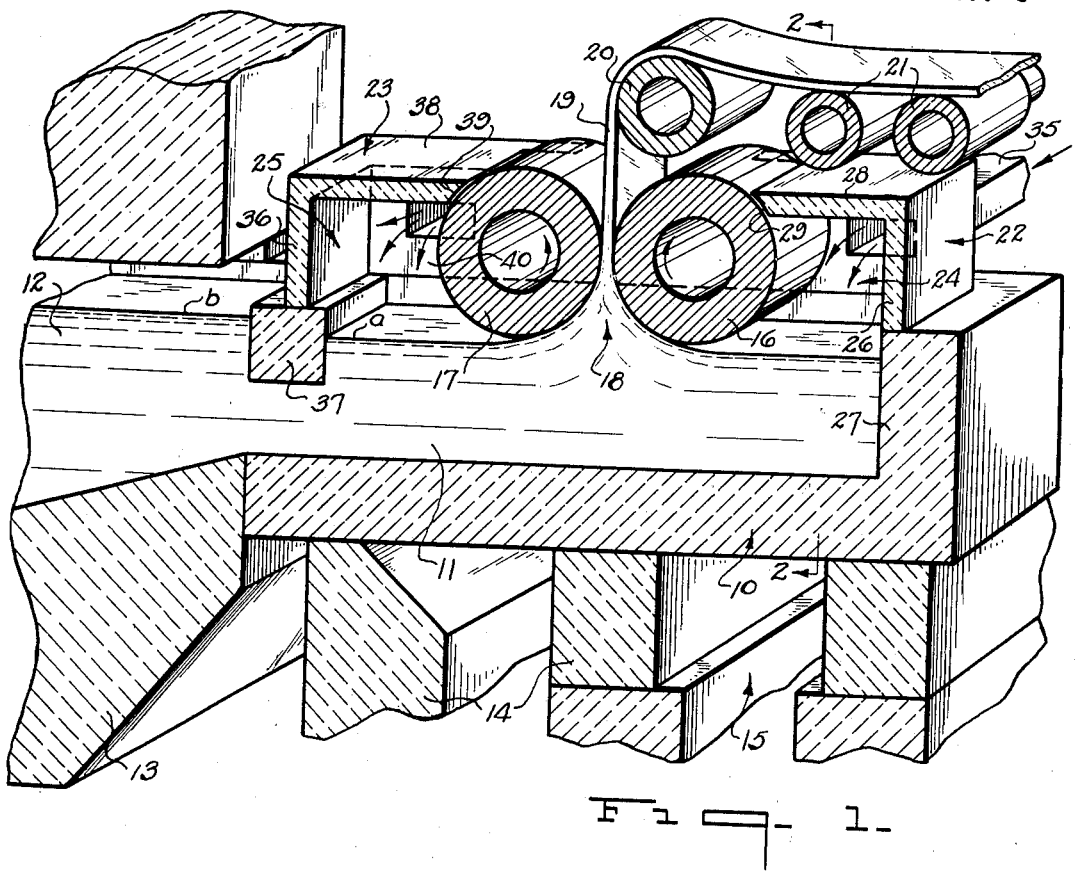
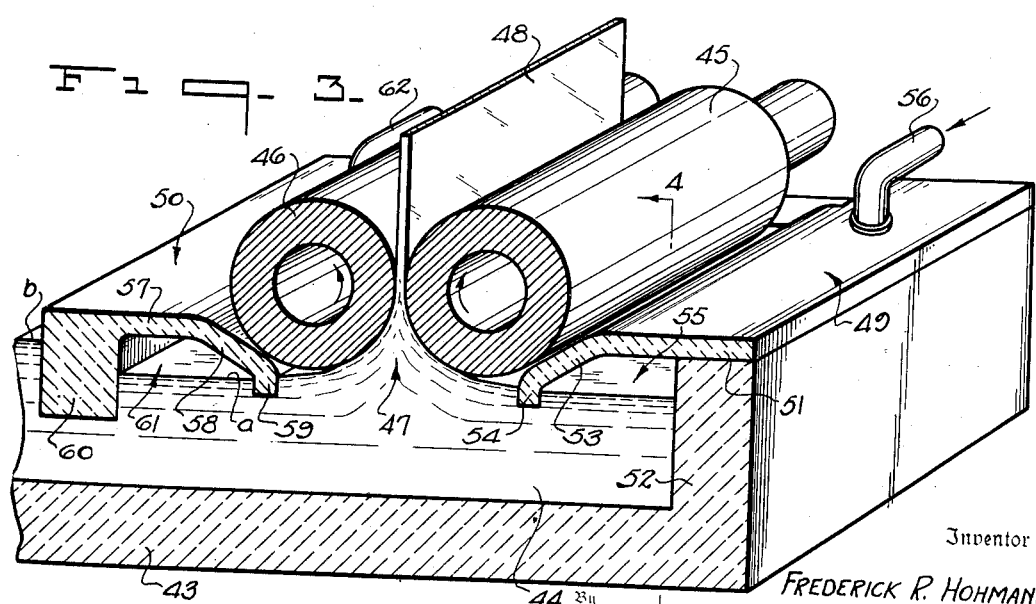
Inventor
FREDERICK R. HOHMANN.
Frank Fraser
Attorney June 5, 1934.　　　　F. R. HOHMANN　　　　1,961,494
SHEET GLASS APPARATUS
Filed Aug. 10, 1933　　　　2 Sheets-Sheet 2
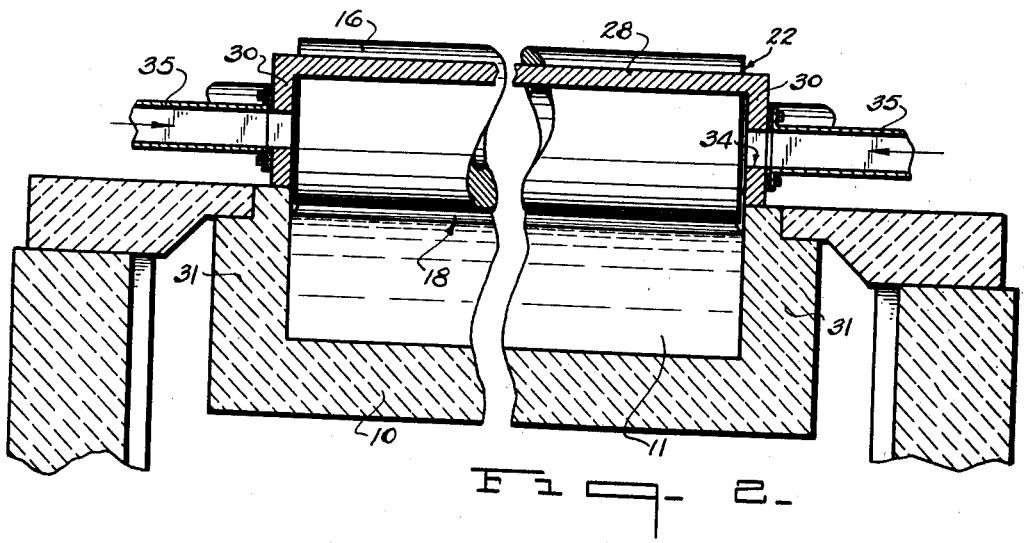
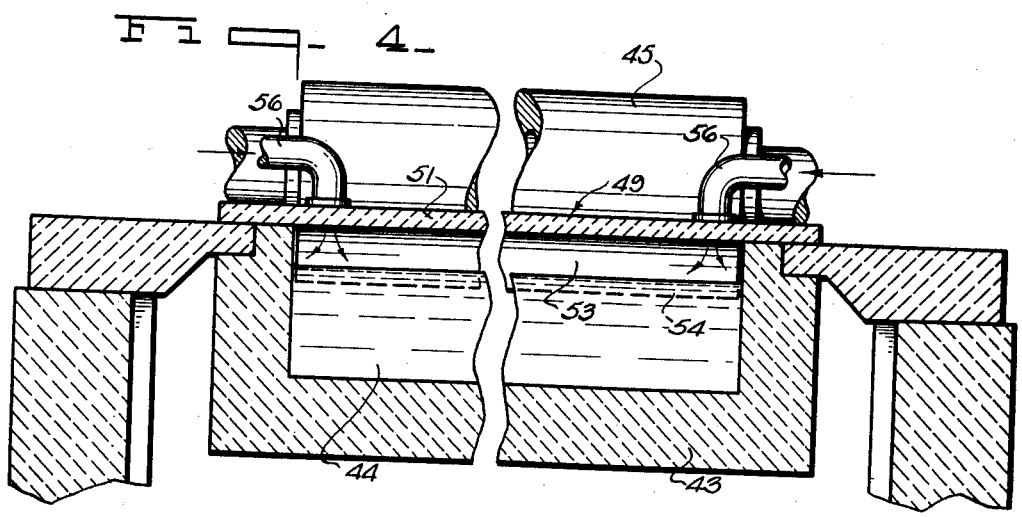
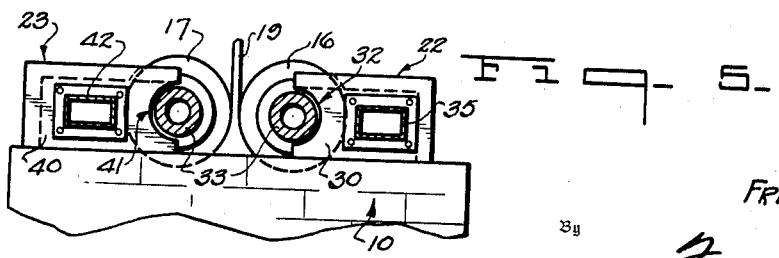
Inventor
FREDERICK R. HOHMANN.
By Frank Fraser
Attorney Patented June 5, 1934

1,961,494

UNITED STATES PATENT OFFICE 1,961,494

SHEET GLASS APPARATUS

Frederick R. Hohmann, Charleston, W. Va., assignor to Libbey-Owens-Ford Glass Company, Toledo, Ohio, a corporation of Ohio Application August 10, 1933, Serial No. 684,501

16 Claims. (Cl. 49—33)

The present invention relates broadly to the manufacture of glass and more particularly to improvements in apparatus for producing sheet glass by a continuous rolling operation.

This invention has utility when incorporated in a rolling machine for producing continuous sheet glass wherein a pair of horizontally arranged forming rolls is positioned above a working receptacle containing a mass of molten glass, said rolls being spaced from one another to create a vertical sheet forming pass therebetween and being positively driven in a manner to draw a relatively heavy body of glass upwardly from the molten mass and reduce it to a sheet of substantially predetermined and uniform thickness. In order that proper formation of the sheet may take place, it is of course essential that sufficient glass be supplied to the forming rolls so that an actual rolling of the glass may be achieved.

An important object of the invention, therefore, resides in the provision of novel means for facilitating and improving generally the advancing of the molten glass upwardly from the working receptacle to the sheet forming rolls whereby the requisite amount of glass necessary at the sheet forming pass to permit an actual rolling thereof will be assured.

Another object of the invention is the provision of an apparatus wherein a continuous supply of molten glass is adapted to be forced upwardly from the molten mass of glass within the working receptacle to the sheet forming pass by the application of a downward pressure upon the said mass adjacent to but outwardly of the forming rolls.

A further object of the invention is the provision of such an apparatus embodying means positioned above the molten glass within the working receptacle alongside of the forming rolls outwardly thereof and forming substantially closed chambers, and means for building up a fluid pressure within each chamber, said pressure acting upon the surface of the mass of molten glass to cause the glass to be forced upwardly through the sheet forming pass.

Still another object of the invention is to provide means for separating the upper strata of glass within the working receptacle from the upper strata of glass within the furnace with which the said receptacle is associated so as to cause the flow of sub-surface glass from the said furnace into the said receptacle.

Other objects and advantages of the invention will become more apparent during the course of the following description when taken in connection with the accompanying drawings.

In the drawings wherein like numerals are employed to designate like parts throughout the same, Fig. 1 is a perspective sectional view through sheet glass rolling apparatus constructed in accordance with the present invention, Fig. 2 is a section taken substantially on line 2—2 of Fig. 1, Fig. 3 is a view similar to Fig. 1 but showing an alternative arrangement, Fig. 4 is a section taken substantially on line 4—4 of Fig. 3, and Fig. 5 is a side elevation of the form of invention illustrated in Fig. 1.

Referring now to the drawings and particularly with reference first to Figs. 1 and 2, the apparatus disclosed includes a relatively shallow working receptacle 10 adapted to contain a mass of molten glass 11 which is continuously supplied thereto from a source of supply 12 melted and refined in any suitable type of glass melting furnace 13. The working receptacle 10 may be supported upon stools 14 within a heating chamber 15 heated in any desired manner.

Positioned transversely above receptacle 10 is a pair of horizontally disposed sheet forming rolls 16 and 17 respectively, said rolls being positively driven and mounted with respect to one another to create a sheet forming pass therebetween. Upon rotation of the said rolls in the directions indicated by the arrows, they will function to draw a relatively heavy body of molten glass 18 upwardly from the molten mass 11 and reduce it to a sheet 19 of substantially predetermined and uniform thickness. This sheet is preferably continued upwardly for a relatively short distance and then deflected into the horizontal plane about a bending roll 20, the said sheet being supported in its horizontal run upon a plurality of horizontally aligned conveyor rolls 21 and carried forwardly into and through an annealing leer (not shown).

In accordance with the present invention, there is arranged above the working receptacle 10 alongside of the forming rolls 16 and 17 and outwardly thereof the refractory hood-like members 22 and 23 respectively, said members being adapted to cooperate with the adjacent forming rolls to form substantially closed chambers 24 and 25 above the mass of molten glass 11.

The hood member 22 comprises a vertical outer side wall 26 supported upon the closed end 27 of the working receptacle 10 and a horizontal top wall 28 located slightly beneath the top of the adjacent forming roll 16 and having its inner edge 29 positioned closely adjacent to and curved to fit the said roll 16. The hood member 22 extends the entire width of the working receptacle and is provided with vertical end walls 30 which are supported directly upon the side walls 31 of said receptacle. The inner edge of each end wall 30 is cut away as at 32 (Fig. 5) so as to fit around the reduced end portion 33 of the respective forming roll. Each end wall 30 of hood 22 is provided with an opening 34 with which communicates a conduit 35, said conduit being carried at its inner end by the respective side wall of said hood and having connection with a suitable blower, air compressor or other means which may be provided for building up the desired fluid pressure within the chamber 24.

The hood member 23 outwardly of forming roll 17 comprises a vertical outer side wall 36 which rests upon a refractory bar 37 arranged transversely within the working receptacle 10 at substantially the juncture thereof with the furnace 13. The hood 23 also includes a horizontal top wall 38 located slightly beneath the top of forming roll 17 and having its inner edge curved as at 39 and arranged closely adjacent the said roll. The hood 23 is further provided with vertical end walls 40 supported directly upon the side walls 31 of the working receptacle, the inner edges of the said end walls 40 being likewise cut away as at 41 (Fig. 5) to fit around the reduced end portions 33 of forming roll 17. Each of the end walls 40 of hood 23 is provided with an opening with which communicates a conduit 42 having connection with any suitable means provided for building up the desired fluid pressure within the chamber 25.

In carrying the invention into practice, the forming rolls 16 and 17 are preferably initially positioned so that the lower portions of their peripheries are arranged slightly beneath the level of the mass of molten glass 11 within the working receptacle 10 and at such time the glass level in the working receptacle will be the same as that within the furnace 13. After the rolls have been properly positioned and placed in rotation to draw the body of glass 18 upwardly, the desired air or fluid pressure is built up within the chambers 24 and 25. This pressure acts upon the upper surface of the molten mass of glass 11 in a manner to depress the same and thereby cause the molten glass to be forced or urged upwardly through the sheet forming pass between the forming rolls 16 and 17.

After the proper pressure has been built up, the level $a$ of the molten glass within the working receptacle will be slightly lower than the level $b$ of the glass within the furnace as shown in Fig. 1. When this condition is attained, the forming rolls 16 and 17 will be no longer immersed within the mass of molten glass, but instead will be located entirely above the same. The fluid pressure within the chambers 24 and 25 is, of course, adapted to be maintained constant so long as the rolling operation continues. If preferred, the forming rolls may be initially positioned either at or slightly above the normal level of the mass of molten glass within the working receptacle although, as pointed out above, it is preferred that the rolls be initially slightly immersed within the molten mass.

By maintaining a constant uniform downward pressure upon the molten mass of glass 11 at opposite sides of the forming rolls, the said glass will be continuously forced or urged upwardly through the outlet between the forming rolls, and in this manner a constant supply of glass of sufficient quantity to permit an actual rolling thereof to sheet form will be at all times supplied to the sheet forming pass.

The bar 37 separates the upper strata of glass 12 within the furnace 13 from the upper strata of glass 11 within working receptacle 10 so as to cause the flow of sub-surface glass from the former into the latter, the said glass flowing through the submerged passageway defined by the bar 37 and the bottom of the working receptacle.

In Figs. 3 and 4 is illustrated a modified type of apparatus also embodying the principles of the present invention. Referring more particularly to these figures, the numeral 43 designates a relatively shallow working receptacle containing a mass of molten glass 44. Positioned transversely above the receptacle are the horizontally disposed sheet forming rolls 45 and 46 which are adapted, upon rotation, to draw a relatively heavy body of molten glass 47 upwardly from the mass and reduce it to a sheet 48 of substantially predetermined and uniform thickness. Also disposed above the working receptacle 43 alongside of the forming rolls 45 and 46 are the horizontal lip-tiles 49 and 50 respectively.

The lip-tile 49 includes a substantial flat horizontal portion 51 supported upon the outer end wall 52 of the working receptacle and a downwardly and inwardly inclined portion 53 terminating in a down-turned lip 54 which is slightly immersed within the molten mass of glass 44. Thus, there is provided beneath the lip-tile 49 a substantially closed chamber 55. Carried adjacent each end of the lip-tile 49 is an inlet pipe 56, said pipe being in communication with chamber 55 and also having connection with a suitable blower or other air compressing means employed for building up the desired fluid pressure within the said chamber.

The lip-tile 50 is preferably supported at its opposite ends upon the side walls of the working receptacle and also comprises a substantially flat horizontal portion 57 and a downwardly and inwardly inclined portion 58 terminating in the down-turned lip 59 which is immersed within the molten glass. Carried by or formed integral with the lip-tile 50 is a bar 60 extending transversely of the working receptacle and being immersed within the molten mass of glass 44, said bar cooperating with the lip 59 and the side walls of the receptacle to provide a substantially closed chamber 61 beneath the said lip-tile 50 and into which air or other fluid is adapted to be forced through conduits 62 to build up the desired pressure therein.

The bar 60 separates the upper strata of glass within the furnace from the upper strata of glass within the working receptacle, thereby causing the flow of sub-surface glass from the former into the latter.

The operation of this form of the invention is substantially the same as described above in connection with the form of invention illustrated in Figs. 1, 2 and 5. That is to say, after the forming rolls 45 and 46 have been placed in position and started rotating, the desired fluid pressure is built up and maintained within the chambers 55 and 61. This pressure acting upon the surface of the mass of molten glass will cause the glass to be forced or urged upwardly through the outlet or pass between the forming rolls, as a result of which the level of the molten glass within the working receptacle, indicated at $a$, will be slightly lower than the level of the molten glass within the furnace, indicated at $b$.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, means positioned above the molten glass within the receptacle alongside one of said rolls and forming a substantially closed chamber, and means for building up a fluid pressure within said chamber, said pressure acting upon the surface of the mass of molten glass to cause the glass to be forced upwardly through said pass.

2. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, means positioned above the molten glass within the receptacle alongside the forming rolls outwardly thereof and forming substantially closed chambers, and means for building up a fluid pressure within each chamber, said pressure acting upon the surface of the mass of molten glass to cause the glass to be forced upwardly through said pass.

3. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, a hood-like member positioned above the molten glass within the receptacle alongside one of said rolls outwardly thereof, and means for building up an air pressure beneath said hood-like member, said pressure acting upon the surface of the mass of molten glass to cause the glass to be forced upwardly through said pass.

4. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, hood-like members positioned above the molten glass within the receptacle alongside of the forming rolls outwardly thereof, and means for building up an air pressure beneath each hood-like member, said pressure acting upon the surface of the mass of molten glass to cause the glass to be forced upwardly through said mass.

5. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, means positioned above the molten glass within the receptacle alongside one of said rolls and cooperating therewith to form a substantially closed chamber, and means for building up a fluid pressure within said chamber, said pressure acting upon the surface of the mass of molten glass to cause the glass to be forced upwardly through said pass.

6. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, means positioned above the molten glass within the receptacle alongside of the forming rolls outwardly thereof and cooperating therewith to form substantially closed chambers, and means for building up a fluid pressure within each chamber, said pressure acting upon the surface of the mass of molten glass to cause the glass to be forced upwardly through said pass.

7. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, a hood-like member positioned above the molten glass within the receptacle alongside one of said rolls outwardly thereof and cooperating therewith to form a substantially closed chamber, and means for building up an air pressure within said chamber, said pressure acting upon the surface of the mass of molten glass to cause the glass to be forced upwardly through said pass.

8. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, hood-like members positioned above the molten glass within the receptacle alongside of the forming rolls outwardly thereof and cooperating therewith to form substantially closed chambers, and means for building up an air pressure within each chamber said pressure acting upon the surface of the mass of molten glass to cause the glass to be forced upwardly through said pass.

9. In sheet glass apparatus, a furnace containing a source of molten glass, a working receptacle associated with said furnace and receiving molten glass therefrom, a pair of horizontal driven forming rolls positioned transversely above the receptacle and arranged to provide a substantially vertical pass therebetween, said rolls being adapted to draw a relatively heavy body of molten glass upwardly from the mass of glass within the receptacle and reduce it to a sheet of substantially predetermined thickness, means positioned above the molten glass within the receptacle alongside the forming rolls outwardly thereof and forming substantially closed chambers, means for building up a fluid pressure within each chamber, said pressure acting upon the surface of the mass of molten glass to cause the glass to be forced upwardly through said pass, and means for separating the upper strata of glass within the furnace from the upper strata of glass within the working receptacle to cause the flow of sub-surface glass from the former into the latter.

10. In sheet glass apparatus, a furnace containing a source of molten glass, a working receptacle associated with said furnace and receiving molten glass therefrom, a pair of horizontal driven forming rolls positioned transversely above the receptacle and arranged to provide a substantially vertical pass therebetween, said rolls being adapted to draw a relatively heavy body of molten glass upwardly from the mass of glass within the receptacle and reduce it to a sheet of substantially predetermined thickness, hood-like members positioned above the molten glass within the receptacle alongside of the forming rolls outwardly thereof, means for building up an air pressure beneath each hood-like member, said pressure acting upon the surface of the mass of molten glass to cause the glass to be forced upwardly through said pass, and means for separating the upper strata of glass within the furnace from the upper strata of glass within the working receptacle to cause the flow of sub-surface glass from the former into the latter.

11. In sheet glass apparatus, a furnace containing a source of molten glass, a working receptacle associated with said furnace and receiving molten glass therefrom, a pair of horizontal driven forming rolls positioned transversely above the receptacle and arranged to provide a substantially vertical pass therebetween, said rolls being adapted to draw a relatively heavy body of molten glass upwardly from the mass of glass within the receptacle and reduce it to a sheet of substantially predetermined thickness, means positioned above the molten glass within the receptacle alongside of the forming rolls outwardly thereof and cooperating therewith to form substantially closed chambers, means for building up a fluid pressure within each chamber, said pressure acting upon the surface of the mass of molten glass to cause the glass to be forced upwardly through said pass, and means for separating the upper strata of glass within the furnace from the upper strata of glass within the working receptacle to cause the flow of sub-surface glass from the former into the latter.

12. In sheet glass apparatus, a furnace containing a source of molten glass, a working receptacle associated with said furnace and receiving molten glass therefrom, a pair of horizontal driven forming rolls positioned transversely above the receptacle and arranged to provide a substantially vertical pass therebetween, said rolls being adapted to draw a relatively heavy body of molten glass upwardly from the mass of glass within the receptacle and reduce it to a sheet of substantially predetermined thickness, hood-like members positioned above the molten glass within the receptacle alongside of the forming rolls outwardly thereof and cooperating therewith to form substantially closed chambers, means for building up an air pressure within each chamber, said pressure acting upon the surface of the mass of molten glass to cause the glass to be forced upwardly through said pass, and means for separating the upper strata of glass within the furnace from the upper strata of glass within the working receptacle to cause the flow of sub-surface glass from the former into the latter.

13. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, a lip-tile positioned above the molten glass within the receptacle alongside one of said rolls outwardly thereof, the inner edge of said lip-tile being immersed within the molten glass, and means for building up a fluid pressure beneath the lip-tile, said pressure acting upon the surface of the mass of molten glass to cause the glass to be forced upwardly through said pass.

14. In sheet glass apparatus, an upwardly opening receptacle containing a mass of molten glass, a pair of horizontal driven forming rolls positioned transversely above the receptacle and arranged to provide a substantially vertical pass therebetween, said rolls being adapted to draw a relatively heavy body of molten glass upwardly from said mass and reduce it to a sheet of substantially predetermined thickness, lip-tiles positioned above the molten glass within the receptacle alongside the forming rolls outwardly thereof, the inner edges of said lip-tiles terminating beneath the said forming rolls and being immersed within the molten glass, and means for building up an air pressure beneath each lip-tile, said pressure acting upon the surface of the mass of molten glass to cause the glass to be forced upwardly through said pass.

15. In sheet glass apparatus, a furnace containing a source of molten glass, a working receptacle associated with said furnace and receiving molten glass therefrom, a pair of horizontal driven forming rolls positioned transversely above the receptacle and arranged to provide a substantially vertical pass therebetween, said rolls being adapted to draw a relatively heavy body of molten glass upwardly from the mass of glass within the receptacle and reduce it to a sheet of substantially predetermined thickness, lip-tiles positioned above the molten glass within the receptacle alongside the forming rolls outwardly thereof, the inner edges of said lip-tiles terminating beneath the said forming rolls and being immersed within the molten glass, means for building up a fluid pressure beneath each lip-tile, said pressure acting upon the surface of the mass of molten glass to cause the glass to be forced upwardly through said pass, and means for separating the upper strata of glass within the furnace from the upper strata of glass within the working receptacle to cause the flow of sub-surface glass from the former into the latter.

16. In sheet glass apparatus, a furnace containing a source of molten glass, a working receptacle associated with said furnace and receiving molten glass therefrom, a pair of horizontal driven forming rolls positioned transversely above the receptacle and arranged to provide a substantially vertical pass therebetween, said rolls being adapted to draw a relatively heavy body of molten glass upwardly from the mass of glass within the receptacle and reduce it to a sheet of substantially predetermined thickness, lip-tiles positioned above the molten glass within the receptacle alongside the forming rolls outwardly thereof, the inner edges of said lip-tiles terminating beneath the said forming rolls and being immersed within the molten glass, means for building up an air pressure beneath each lip-tile, said pressure acting upon the surface of the mass of molten glass to cause the glass to be forced upwardly through said pass, and means carried by the lip-tile adjacent the furnace and being immersed within the molten glass at substantially the juncture of said furnace and working receptacle to cause the flow of sub-surface glass from the former into the latter.

FREDERICK R. HOHMANN.